June 4, 1968 E. E. KLEINSCHMIDT ET AL 3,387,085

TRANSMITTER

Original Filed May 6, 1963 3 Sheets-Sheet 1

INVENTORS
EDWARD E. KLEINSCHMIDT
KURT TAUBMANN

BY Joseph J. Grass
ATTORNEY

INVENTORS
EDWARD E. KLEINSCHMIDT
KURT TAUBMANN

BY Joseph J. Grass
ATTORNEY

INVENTORS
EDWARD E. KLEINSCHMIDT
KURT TAUBMANN

BY Joseph J. Grass
ATTORNEY

United States Patent Office 3,387,085
Patented June 4, 1968

3,387,085
TRANSMITTER

Edward E. Kleinschmidt, Salisbury, Conn., and Kurt Taubmann, Lake Bluff, Ill., assignors to SCM Corporation, a corporation of New York Original application May 6, 1963, Ser. No. 278,241. Divided and this application May 5, 1967, Ser. No. 636,496
15 Claims. (Cl. 178—17)

ABSTRACT OF THE DISCLOSURE

There is disclosed a keyboard transmitter with symbol key operated switches, a diode matrix with multiple inputs connected to the switches and with multiple circuits connected individually to a commutator. The diode matrix is capable of being energized by operation of a selected one of the switches to place potential on selected portions of the commuator in accord with a grid block pattern. The commutator effects cyclical read-out for each symbol of a single electrical signal comprising sequential intra-signal pulse units including a start pulse unit and a multiplicity of symbol pulse units. This signal is usable to start progressive transcription printing and to continue such printing until a symbol has been completely scribed on a record medium.

This is a division of copending U.S. patent application Ser. No. 278,241, filed May 6, 1963, now Patent No. 3,324,240, patented June 6, 1967, to which reference may be had for greater detail.

This invention pertains to automatic telegraphic systems and apparatus and more particularly to transmitters for systems whereby transmitted logic is printed in directly legible symbols representative of characters of a language as well as special codes or telegraphic codes. Each symbol is progressively formed by a plurality of printing operations and will be referred to as telegraphic progressive symbol printing.

The transmitting apparatus of the invention is especially useful in conjunction with radio signaling systems as well as the usual telegraphic signaling channels. The invention does not use type, rather it specifically pertains to that form of telegraphic system wherein each character or symbol is divided into a predetermined number of units, transmitted as such, received and progressively printed in a predetermined time-space pattern on a full page of paper (rather than on tape) until a representation of the character being transmitted has been formed thereon. It is not a facsimile system per se in that pre-scanning of a symbol is not utilized.

In previously known facsimile apparatus, the paper was moved continuously at a specific speed as was the printing mechanism and in certain models this relationship caused the printed matter to trail off toward the lower edge of the paper. Later modifications had the printing mechanism mounted angularly canted in respect to the continuous movement of the paper but difficulty was still encountered in synchronizing the printing speed with the continuously moving paper and therefore the printing matter still had a tendency to frequently trail off in an upward or downward slant. Thus, an acceptable, easily read copy was still difficult to obtain without constantly readjusting of the receiver mechanism and controls.

In the present invention no definite code is used, no pre-scanning is necessary and the transmitted signals from an electronic keyboard come in on the line to the receiver and are printed directly on the paper. The incoming signal (which in the exemplary embodiment includes forty-eight (48) units) pulses a hammer magnet and the print hammer strikes the paper through an inked ribbon and prints small dots in a predetermined order to form specific symbols or characters on the paper corresponding to specific signals. By using a stop-start principle, each letter is printed in its own prescribed area in straight lines across the page as occurs with a standard typewriter. The receiver also incorporates standard functions similar to those which are basic to telegraph printers, e g., carriage return, line feed and automatic end-of-line carriage return.

The system and components of the present invention will satisfy a demand for inexpensive telegraphic systems capable of satisfactorily utilizing voice frequency installations, e.g., telephone or radio. Because its signals have 48 pulse points and thirty-five of those are used in the process of forming each symbol or letter character, interruption by normal static pulses should not completely obliterate the unit symbol or cause a wrong symbol to be printed. Such a system can be extremely useful to provide a small, page message, reproducer for police or military vehicles or the like. Furthermore, any type of letter or figure and most other symbols can be printed on a standardized receiver merely by rearranging the unit pulses in each signal in a desired pattern. Each character or figure or other symbol is composed of a series of units or dots originated in a predetermined order by a diode matrix system or similar systems in a signal originating and transmitting unit.

A further object resides in the provision of novel transmission equipment for generating voice frequency code signal transmission currents.

Another object resides in the provision of a novel telegraphic progressive printing transmitter in which all prescanning procedures' end mechanisms have been eliminated, the logic originating entirely within a diode matrix system of an electronic keyboard.

Further objects of this invention will become apparent from the following detailed description when read in conjunction with the accompanying drawings in which.

Figure 8:
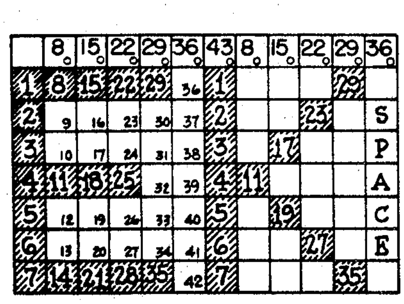
Figure 7:
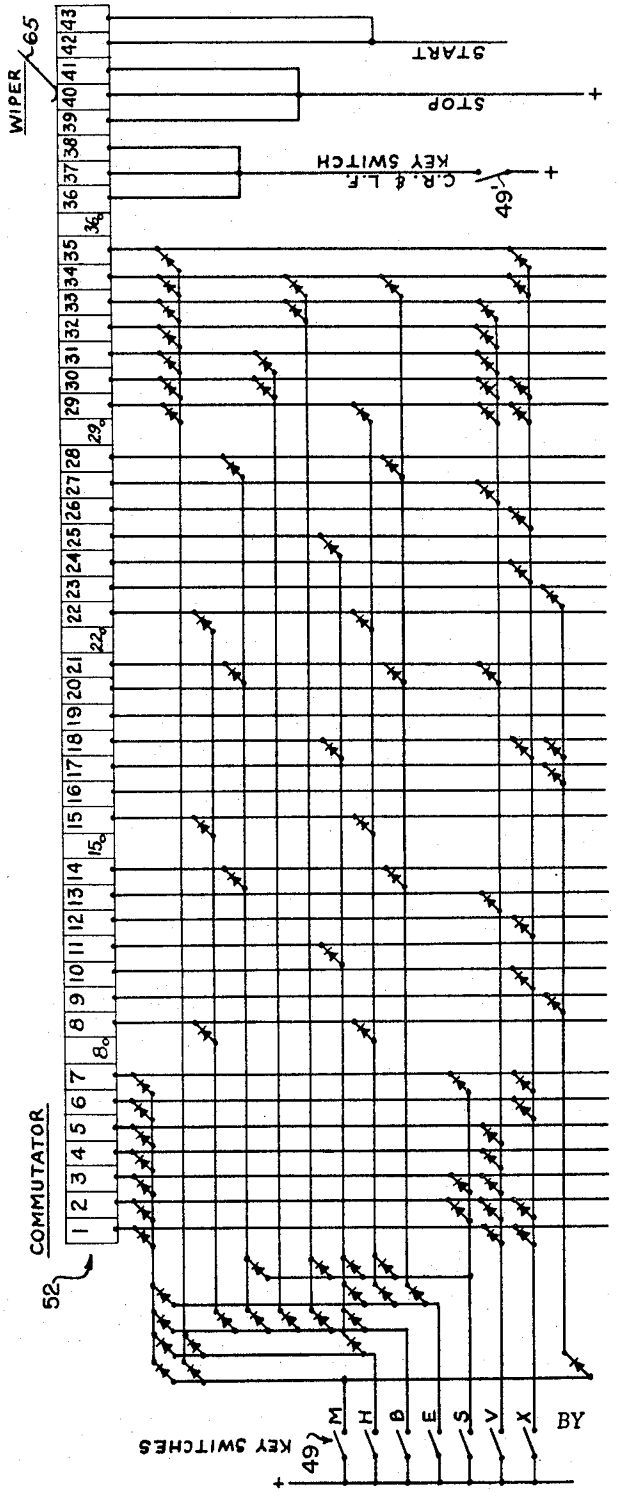

FIGURE 7 is a schematic layout of the 48 segments of the commutator, a portion of an exemplary diode matrix group and several of the key switches. The matrix portion shown is wired to the proper commutator segments and to selected key switches to result in transmission of the letters M, H, B, E, S, V and X when the appropriate key switch is closed; and FIGURE 8 is a block representation of the letters E and K, the shaded squares being those units which must be printed to effect progressive printing of the letter, the shaded squares being numbered in the order of their progressive recording on the paper.

Figures 1, 2, 3:
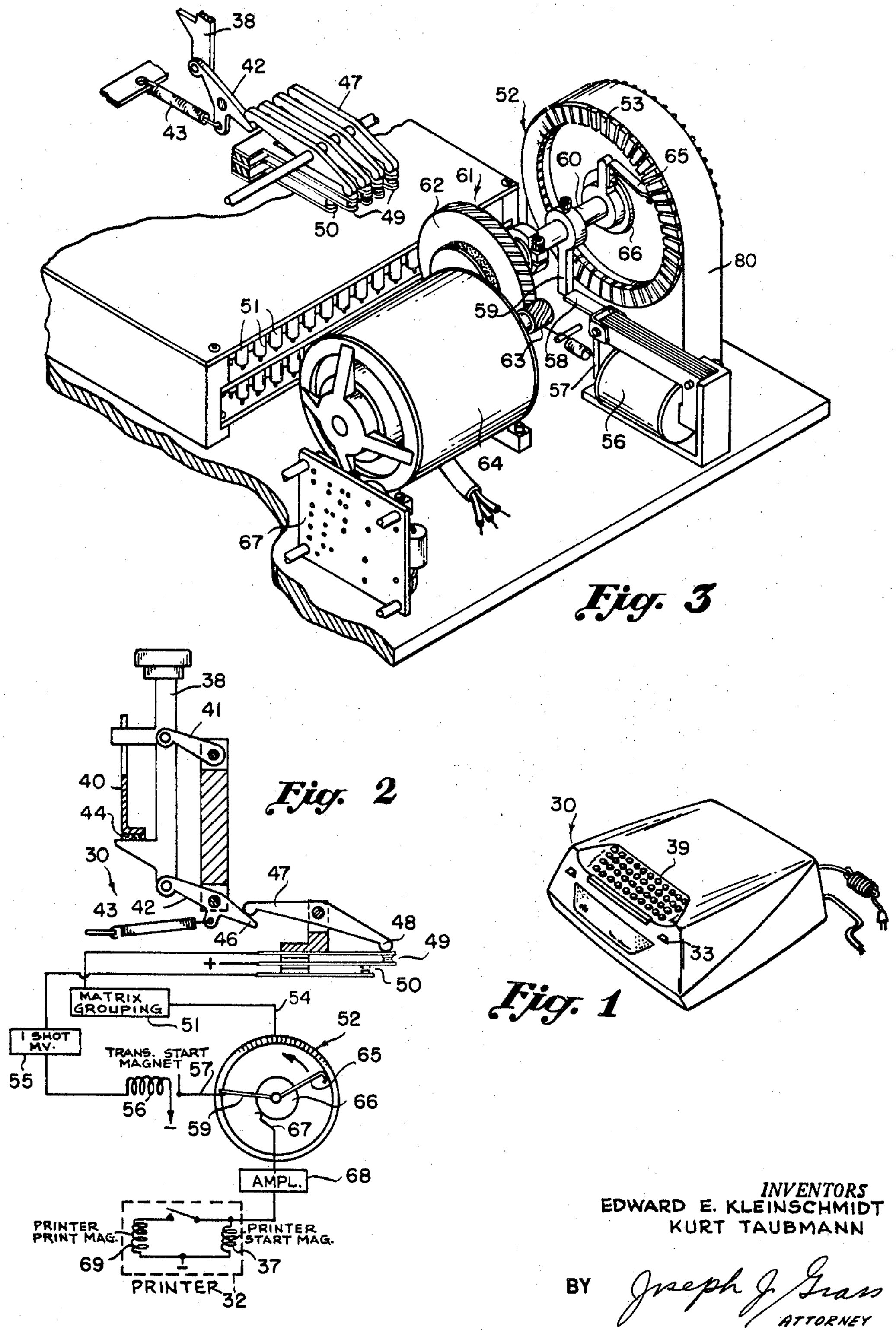
FIGURE 1 is a reduced size perspective view of a complete keyboard transmitting unit constructed in accord with the present invention.
FIGURE 2 is a diagrammatic drawing showing, in elevation, a single key and switch assembly of the keyboard unit and broadly illustrates the concept by which the key controlled switching system connects to set up the matrix group which in turn connects a current source to selected segments of the commutator. A portion of a monitoring receiving printer is also illustrated in this figure.
FIGURE 3 is a cut away perspective view illustrating the principal components in the keyboard transmitting unit.

The transmitter unit 30, the exterior of which is shown in perspective in FIGURE 1, will be connected to a power source (not shown) furnishing electrical power, e.g., 110 volts AC and 12 volts DC, for drive power and signal power. The output signal line from the transmitter unit can be connected by direct line, e.g., a power circuit or telephone line, to the input of a receiver unit 32 (of a type disclosed in the above mentioned U.S. patent application) or by radio equipment through a radio channel. The power supply circuits to the transmitter unit 30 is turned "on" by an "ON-OFF" switch 33, whereupon the transmitter unit 30 will be ready for operation.

Referring to FIGURE 2, when a key 38 of the keyboard 39 is depressed, it will move down along vertical guide slots in a comb 40, also being guided in a pantograph manner by two pivoted levers 41 and 42. The key unit is moved downwardly against the biasing force of a spring 43 which is connected to a lug on the lower lever 42, and urges the key pantograph unit in a CW direction. When released, the key 38 returns under spring bias to its normal position whereat a lower key lug abuts a bumper strip 44, made of a material such as felt, cork, rubber or foam plastic.

When the key is depressed and the lower lever 42 of the pantograph linkage for key 38 moves CCW against the force of spring 43, its projected right-hand lever arm 46 pushes upward against one arm of an associated switch operator lever 47 causing the lever to rotate CW, so a second arm 48 of the operator lever in turn will engage and cause two associated leaf switches 49 and 50 to close in respective, sequential order although closure is almost simultaneous. The first (upper) switch 49 closes a circuit to a diode matrix bank 51, setting up a predetermined circuit through selected diodes in accord with the key which was depressed. The second switch 50 closes a circuit to the transmitter starting mechanism which will be discussed hereinafter.

The diode matrix bank 51 in the transmitter unit can be wired to form characters of any language using English letters and many other foreign language characters and symbols, so long as they can be formed within the established limits of the squares in the symbol blocks as shown in FIGURE 8. If desired, these limits can, of course, be expanded by making certain changes and modifications in the examplary mechanisms and circuits and will fall within the confines of this present invention.

The various symbol keys on the keyboard are similar and each will operate two leaf switch units, the first of which in each case connects a circuit to a desired specific matrix diode pattern associated with the specific key and the second of which energizes the transmitter start magnet. In addition to the keyboard, transmitter 30 incorporates a motor driven commutator, by which the key selected matrix diode circuits are energized in a predetermined order and timed relationship, and a commutator start-stop magnet and mechanism.

Figure 4:
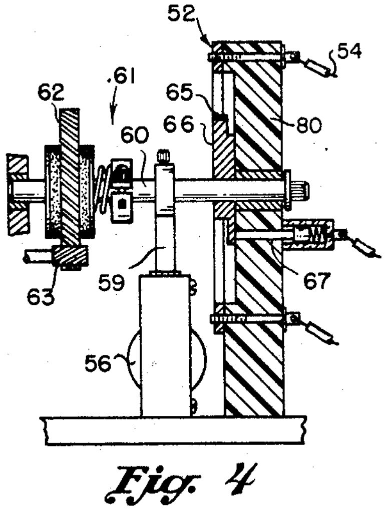
FIGURE 4 is a vertical cross-section illustrating the transmitter commutator, its drive power input train and its relationship to the transmitter start-stop magnet.

The transmitter commutator 52 can be seen in FIGURES 2, 3 and 4 (it is also represented in FIGURE 7) and, in the exemplary embodiment herein described, consists of forty-eight individual stationary segments 53 arranged in a ring on a dielectric base 80 and having no electrical connection between each other. If more complex characters or more functions are needed, or if more time were needed to accomplish the existing functions, additional segments 53 may be added to the commutator. Each segment 53 of commutator 52 is directly connected via an individual line 54 to the diode matrix bank 51 (only one line 54 being depicted in FIGURE 2). The connections will be explained in more detail hereinafter with reference to FIGURE 7.

After the first switch 49, the matrix switch, associated with a depressed key is closed and has set up the desired diode pattern in the matrix bank 51, the second switch 50 is closed and completes a circuit sending current through a one-shot multivibrator 55 (FIGURE 2) to a transmitter starting magnet 56, which, when energized, attracts the armature 57 shown in FIGURE 3, moving it in a CCW direction until its blocking end 58 moves out the path of a commutator shaft blocking lever 59. With the blocking armature removed from its path, blocking lever 59 and commutator shaft 60 will start rotating due to drive force transmitted through a slip clutch 61 which includes a gear 62 driven by a worm 63 rotated directly from the transmitter motor 64.

Attached to the right end of and rotating with the commutator shaft 60 is a wiper arm 65 which in turn is fixed to a wiper disc 66 also rotating with shaft 60. Working in sliding contact relationship with the rotational wiper disc 66 is a brush contact 67 (FIGURES 2 and 4). It is through this brush contact 67 that electrical pulses are sent over an output line to the transmitter amplifier 68. The amplified pulses are sent out over the telegraphic network to the aforedescribed receiver start-stop magnet 37 and thence on into the coil of the print hammer operating magnet 69 after certain switching operations have been performed which will be explained later in the text. Note, the rotational speed of the segment wiper 65 is such that it will make a complete rotation before the key-operated matrix switch can open upon release of the depressed key.

Figure 6:
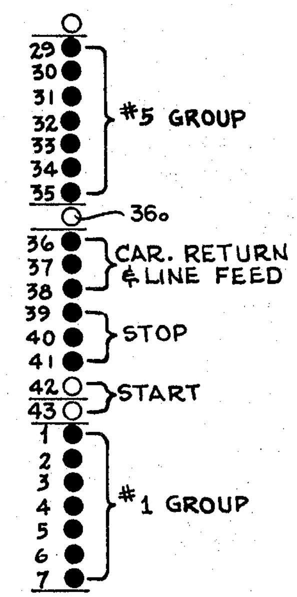
FIGURE 6 is a schematic drawing showing three groups of commutator segments: the fifth group, the last group which controls the functions and the first group.

The basic signal for the system is a character or symbol block made up of forty-eight individual pulse units which, for convenience, can be referred to as "mark" or "space." Each pulse unit corresponds to a segment 53 of the commutator 52. Shown in FIGURE 8, the signal pulse units are arranged in six vertical rows of eight pulse positions or squares in a rectangular block. Thirty-five squares (or pulse units) of the signal block are used to form the actual character or symbol while the remaining thirteen squares are used in the performance of or to effect the various functions such as "character spacing," "line feed," "carriage return," "stop" and "start." This is more clearly illustrated in FIGURE 6 where each numbered commutator segment corresponds to the same number in the squares of the character or symbol block (FIGURE 8).

As stated hereinbefore, the diodes in the matrix bank 51 are wired to set up circuits to the appropriate commutator segments for desired characters and symbols in accord with a depressed key and each of these characters will be printed on a page of paper in one or more printing sequences passing down from square to square from the top to bottom of each vertical row starting in the first row in a character block progressing through the first five rows from left to right. This, too, will be more fully explained hereinafter.

Figure 5:
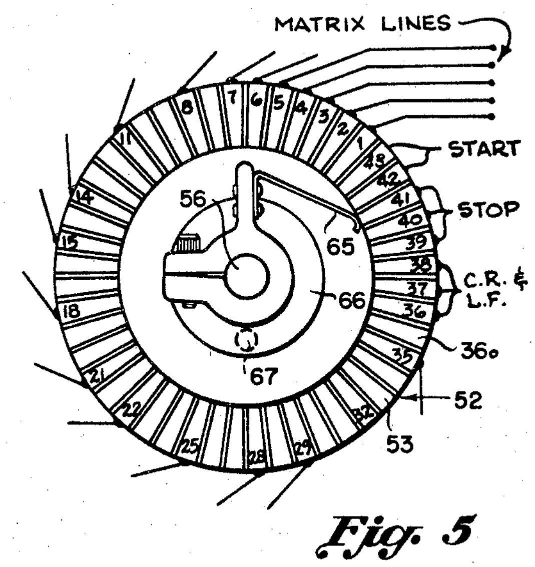
FIGURE 5 represents the transmitter commutator in elevation from the left side (see FIGURE 3), and shows the segments which are wired from the matrix components representing the letter E and also identifies the segments which control the various functions.

After the transmit starting magnet 56 is energized to unblock the commutator shaft 60, the wiper arm 65 begins to move around the inside of the commutator 52 (see FIGURE 5). During initial movement the wiper arm 65 moves off of the stop segment #41 (see FIGURE 7), which has a positive signal potential applied thereto, and moved on to the dead "start" segments #42 and #43. Since the wiper is connected to the transmitter output the signal will commence with two "space" or no-current pulses and during periods when no logic is being transmitted. The receiver 32 is maintained in its stop condition because current is being channelled through the "stop" segment of the commutator 52 and to the receiver start-stop magnet 37. The start of transmission of the next character causes the transmitter wiper arm 65 to move onto the start segments #42 and #43 (FIGURE 5), thereby breaking the circuit and removing the current flow to the receiver.

Looking at FIGURE 5, the transmitter wiper arm 65, continuing its rotational cycle, moves on past the two dead "start" segments 42 and 43 and makes contact with the #1 segment of the commutator. If a potential has been placed on this segment by the matrix 51 which has been conditioned by the depressed key, that started the transmission signal cycle, e.g., the #1 segment will be energized in the case of letter E, the receiver circuit to the print hammer magnet 69 of the receiver is pulsed as the wiper contacts the #1 segment. Such a pulse will occur in a closed circuit from the diode matrix 51 to the #1 segment of the commutator 52, thence through the wiper arm 65 to the wiper disc 66, through the brush contact 67 over the communication lines, or network, to the receiver and finally to its print hammer magnet 69.

For a consecutive print operation a segment of the commutator 52 is contacted by the wiper arm 65 and, if potential has been supplied to that segment by the matrix, the completed circuit sends a pulse to the print hammer magnet and the aforedescribed printing operation is repeated until a completed character, such as shown in FIGURE 8 is formed.

With reference to FIGURE 8, and assuming the letter E is to be scribed, when the commutator wiper arm contacts segment #1 through segment #7 the receiver 32 prints the vertical portion of letter E in the first print row. The commutator wiper arm 65 passing from segment #7 in the first print row moves on to the dead segment #$\mathbf{8_0}$ between segments #7 and #8 and thence on to pulse the second row segments #8, #11 and #14 of the commutator 52 and the print hammer magnet 69 is concurrently pulsed according to the energized segments.

There will be no printing in the next two squares or spaces #9 and #10 (FIGURE 8) because the print magnet 69 receives no pulses. Then another dot is printed in square #11, two more spaces #12 and #13 are skipped and finally the dot in space #14 is printed. The wiper arm 65 makes contact, first with a dead segment #$\mathbf{15_0}$, and then with matrix conditioned segments #15, #18 and #21 of the commutator 52, pulsing the print hammer magnet 69 at appropriate times and the specific dots in the third row are printed in the manner previously described. The wiper arm 65 then contacts a dead segment #$\mathbf{22_0}$ and proceeds to pass matrixed conditioned segments #22, #25 and #28, the print hammer magnet 69 being again pulsed at appropriate times to print the specific dots in the fourth row.

Finally, the wiper arm 65 contacts the final group of print operating segments which have two energized segments #29 and #35 the final corresponding portions of the letter E are printed.

After the wiper 65 has moved off of segment #35 of the commutator 52, the wiper arm 65 contacts a blank segment $\mathbf{36_0}$ to effect energization of start-stop magnet 37. The commutator wiper arm 65 will next contact segments #36, #37 and #38 (the carriage return-line feed segments) and if current is present on those segments, carriage return and line feed will be effected at the receiver 32. Segments #36, #37 and #38 will be energized if a carriage return function is called for from the keyboard transmitter 30. For simplicity, carriage return and line feed will hereinafter be designated simply as CR and LF.

To accomplish the conjoint CR–LF function as a result of a signal from the transmitter keyboard 39, the keyboard includes a key and an associated dual switch assembly for CR–LF, similar to key 38 and associated switches 49 and 50 shown in FIGURE 3. Depressing the CR–LF key will cause the lever 42 for that key to rotate CCW and its end 46 causes an associated switch operating lever 47 to rotate CW, closing the associated first switch 49′ (see FIGURE 7) to the diode matrix bank 51. Switch 49′, when closed, completes a circuit placing positive potential on commutator segments #36, #37 and #38, the three segments which control the CR–LF functions. The second CR–LF key operated switches 50 (see FIGURE 2) is then closed to start the transmitter wiper arm 65 in the same manner as hereinbefore described.

Because the CR–LF key operated switches do not control any circuits in the diode matrix, all of the print operating commutator segments #1–#35 will be dead and the transmitter commutator wiper 65 will therefore pass over the print segments #1–#35 without effect but when it engages segment #36, it will close a circuit between the CR–LF switch on the transmitter keyboard 39 and the receiver 32 so that CR–LF functions are accomplished. The three commutator segments #36, #37 and #38 shown in FIGURE 7 are energized on a CR–LF signal to permit sufficient energizing time to assure starting of the receiver. Likewise, the three segments #39, #40 and #41 are all energized to assure stopping of the receiver.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A transmitter unit for generating selected electrical symbol signals, each signal comprising a multiplicity of serial intra-signal symbol pulse units, portions of certain signals having the same intra-signal succession of symbol pulse units occurring in the same respective time-related interval, said transmitter unit comprising a plurality of symbol selecting means including a plurality of symbol switch means and means for translating operation of any of said symbol switch means into a corresponding series of symbol pulse units useable for visually representing the selected symbol, said translating means including an electronic matrix having a multiplicity of circuit networks, there being one network for each symbol selecting means, the network for each selected symbol including circuits equal in number to the number of symbol pulse units for that symbol, each network having an input connected to the switch means of the respective symbol selecting means, said networks having a multiplicity of electronic components providing unidirectional current paths through each circuit in each network, with predetermined ones of said electronic components being common to predetermined ones of said circuits which, for different symbols, form the same succession of pulse units in the same time-related interval, said circuits having output conductors with some of said output conductors being common to more than one network; said translating means further including commutator means having means providing a single output for the symbol pulse units, means providing the same commutating rate and period regardless of which symbol is to be generated, and means connected to each of said output conductors for sequentially establishing one circuit at a time through the network for the selected symbol.

2. A transmitter unit as defined in claim 1, wherein said commutator means includes means for generating a start pulse unit preceding the generation of symbol pulse units of each signal.

3. A transmitter unit as defined in claim 1, wherein said electronic components are diodes.

4. A transmitter unit as defined in claim 1, wherein said means providing the same commutating rate and period include means for operating said commutator means at a speed which, multiplied by the number of pulse units per signal, generates an intra-signal pulse unit frequency within the voice frequency range.

5. A transmitter unit as defined in claim 1, including means responsive to operation of each of said selecting means for starting, cycling and stopping said commutator means.

6. A transmitter unit as defined in claim 1, wherein said symbol selecting means includes manually operable keys.

7. A transmitter unit as defined in claim 1, including means operable subsequent to operation of each of said symbol selecting means for initiating operation of said commutator means.

8. A transmitter unit as defined in claim 1, wherein said commutator means includes a movable wiper member and electrically insulated segments, connected to said output conductors, with which said wiper member cooperates.

9. A transmitter unit for generating selected electrical symbol signals, each signal comprising a start pulse unit followed by a multiplicity of sequential intra-signal symbol pulse units, portions of certain signals having the same intrasignal succession of symbol pulse units occurring in the same respective time-related interval, said transmitter unit comprising a plurality of symbol selecting means including a plurality of symbol switch means, means for translating operation of any of said symbol switch means into a corresponding succession of start and symbol pulse units, said translating means including an electronic matrix having a multiplicity of networks with a multiplicity of electronic components providing unidirectional current paths, there being one network for each selectable symbol signal, some of said networks having common conductors, predetermined ones of said electronic components being common to predetermined ones of said networks portions of which form the same succession of symbol pulse units in the same time-related interval, said matrix having a plurality of inputs connected to said plurality of switch means and a plurality of outputs, and commutator means connected to said matrix outputs and having means providing an output for the signals, means for generating a start pulse unit, and means for sequentially establishing one circuit at a time through the network for the selected symbol.

10. A transmitter unit as defined in claim 9, wherein said electronic components are diodes.

11. A transmitter unit as defined in claim 9, including means for operating said commutator means at a speed which, multiplied by the number of pulse units per signal, generates an intra-signal pulse unit frequency within the voice frequency range.

12. A transmitter unit as defined in claim 9, including means responsive to operation of each of said selecting means for starting, cycling and stopping said commutator means.

13. A transmitter unit as defined in claim 9, wherein said symbol selecting means includes manually operable keys.

14. A transmitter unit as defined in claim 9, including means operable subsequent to operation of each of said symbol selecting means for initiating operation of said commutator means.

15. A transmitter unit for generating selected electrical symbol signals, each signal comprising a start pulse unit followed by a multiplicity of serial intra-signal symbol pulse units, portions of certain signals having the same intra-signal succession of symbol pulse units occurring in the same respective time-related interval, said transmitter units comprising a plurality of manually actuatable symbol keys and switches operable by said keys, means for translating operation of any of said switches into a corresponding series of symbol pulse units useable for visually representing the selected symbol, said translating means including a diode matrix having a multiplicity of circuit networks, there being one network for each selectable symbol, the network for each selected symbol including circuits providing unidirectional current paths equal in number to the number of symbol pulse units for that symbol, each network having an input connected to the switch for the respective key, said networks having a multiplicity of diodes with predetermined ones of said diodes being in predetermined circuits common to different networks and which common circuits enable generation of the same succession of intra-signal symbol pulse units in the same time-related interval within a signal, said circuits having output conductors with some of said output conductors being common to more than one network, said translating means further including commutator means having means providing an output for succesive signals, means providing the same commutating rate and period regardless of which symbol is to be generated, means for generating a start pulse unit, and means connected to each of said output conductors for sequentially establishing one circuit at a time through the network for the selected symbol, and means responsive to actuation of any of said symbol keys and effective subsequent to closure of the respective switch for initiating operation of said commutator means.

References Cited

UNITED STATES PATENTS

| | | | |
|---|---|---|---|
| 2,656,240 | 10/1953 | Hell | 178—30 |
| 2,658,106 | 11/1953 | Hell | 178—30 |
| 2,659,652 | 11/1953 | Thompson | 178—30 |
| 3,006,997 | 10/1961 | Evensen | 178—17 |

THOMAS A. ROBINSON, *Primary Examiner.*